United States Patent
Harasawa et al.

(10) Patent No.: US 7,137,713 B2
(45) Date of Patent: Nov. 21, 2006

(54) COLOR SHEET HAVING LIGHT-SHIELDING PROPERTY

(75) Inventors: Junichi Harasawa, Ota (JP); Takuo Suzuki, Ashikaga (JP); Hiroki Ashizawa, Ashikaga (JP)

(73) Assignee: Achilles Corporation, Tokyo (JP)

( * ) Notice: Subject to any disclaimer, the term of this patent is extended or adjusted under 35 U.S.C. 154(b) by 148 days.

(21) Appl. No.: 10/806,151

(22) Filed: Mar. 23, 2004

(65) Prior Publication Data

US 2004/0190143 A1   Sep. 30, 2004

(30) Foreign Application Priority Data

Mar. 28, 2003 (JP) ............................. 2003-091032
Jan. 15, 2004 (JP) ............................. 2004-007820

(51) Int. Cl.
  *G02B 27/00* (2006.01)
  *B32B 9/02* (2006.01)

(52) U.S. Cl. .................. 359/601; 359/614; 428/411.1

(58) Field of Classification Search ............... 359/601, 359/590
See application file for complete search history.

(56) References Cited

U.S. PATENT DOCUMENTS 4,034,375 A * 7/1977 Wallin ........................ 342/3
4,457,966 A * 7/1984 Pusch et al. ............... 428/204
4,529,633 A * 7/1985 Karlsson ..................... 428/17
2003/0082975 A1* 5/2003 Harata et al. ............... 442/327
2004/0018360 A1* 1/2004 Hugo ....................... 428/411.1
2004/0152385 A1* 8/2004 Hellwig et al. ............. 442/230

FOREIGN PATENT DOCUMENTS

| JP | A 8-81567   | 3/1996 |
| JP | A 9-241979  | 9/1997 |
| JP | A 10-250002 | 9/1998 |
| JP | A 2002-012679 | 1/2002 |

* cited by examiner

*Primary Examiner*—Mark A. Robinson
*Assistant Examiner*—Mark Consilvio
(74) *Attorney, Agent, or Firm*—Oliff & Berridge, PLC

(57) ABSTRACT

A color sheet having a light-shielding effect comprises at least a reflecting layer and a color layer overcoated on the side of the color sheet where the color sheet is exposed to light from the reflecting layer. The reflecting layer a solar-radiation reflectance of 60% or more in a wavelength range of 780 nm to 1350 nm, and the color layer has a light transmittance of 30% or more in a wavelength range of 780 nm to 1350 nm and a solar-radiation absorbance of 10 to 80% in a wavelength range of 380 nm to 780 nm.

13 Claims, 4 Drawing Sheets

COLOR SHEET HAVING LIGHT-SHIELDING PROPERTY

BACKGROUND OF THE INVENTION

1. Field of the Invention

The present invention relates to a color sheet having a light shielding effect, which is applied, as a film material or the like, to the roofs and exterior walls of buildings such as factories, residences, and the like, the roofs and exterior walls of carrying vehicles such as container cars, refrigeration vehicles, the roofs and exterior walls of ships, plants, storehouses, barns, and the like, and the covers and tents of military use and motorcars, whereby the temperature inside the buildings and so forth can be prevented from rising due to radiation of sunlight, and moreover, the designs and appearances can be improved.

2. Description of the Related Art

The roofs and exterior walls of building and structures are exposed to wind and rain and sunlight, and thus, are ready to be deteriorated. Accordingly, to prevent such deterioration of the roofs and exterior walls and improve the appearance thereof, ordinarily, they are protected by painting with coating materials. In recent years, to enhance the working-efficiency, the technique is carried out, in which color films or sheets suitable for their uses are formed in advance, and are set on the roofs and exterior walls. Thus, effects comparable to those of the above-described painting with coating materials can be simply obtained. In particular, buildings such as residences or the like are exposed to sunlight for a relatively long time. It is preferable to arrange the films or sheets, which effectively suppress from temperature rising inside the buildings especially in summer, onto the roofs and exterior walls of the buildings for improvement of the habitability thereof. Thus, the power consumption of air conditioners used for adjustment of the temperature can be reduced, and thus, the air conditioning cost can be reduced. Moreover, the use of the films or sheets is preferable from the viewpoint of global environments.

Moreover, with the recent distribution container trucks and refrigeration trucks for transporting goods in their low temperature state are generally used. To enhance the refrigerating and cooling effect of the container trucks and the refrigeration trucks, it has been desired to arrange films or sheets having a high heat-shielding property. Recently, it has been more required to give different colors to structures, vehicles, facilities and so forth for more aesthetical appearance, in addition to the high heat-shielding property required as described above.

Furthermore, tents are used outdoors as facilities for refuge and rescue at disaster, and are also used when armies and fire brigades are trained or their practical activities are carried out. However, problematically, on sunny days, the temperature inside the tents is increased, which hinders working or the like inside the tents. As countermeasures against this problem, large-scaled air conditioners are installed. However, it is difficult to decrease the temperature inside the tents, especially inside the large-sized tents and thus, the adjustment of the temperature is troublesome.

Techniques by which films or sheets having a heat shielding property are applied have been carried out for a long time. For example, Japanese Patent Application Laid-open No. Hei 8-81567 discloses a sheet containing an aluminum compound or a diimonium type compound in a specific amount based on a plastic resin so that the sheet has a heat shielding property. Japanese Patent Application Laid-open No. Hei 10-250002 discloses a sheet which is applied so as to be pitched outdoors, in which a layer containing inorganic oxide fine particles doped with a metal is formed on one side of a thermoplastic resin film, and furthermore, a layer containing hydrophilic inorganic colloidal particles is formed so that the heat-shielding property is enhanced. Moreover, Japanese Patent Application Laid-open No. 2002-12679 discloses a color film having heat-shielding property which is produced by mixing at least two type of pigments having a heat-shielding property with a thermoplastic resin film, and forming the mixture into a film.

Such sheets or films as disclosed in Japanese Patent Application Laid-open No. Hei 8-81567 and Japanese Patent Application Laid-open No. Hei 10-250002 are translucent and are suitable to be bonded to window glass sheets. However, the sheets or films are problems in that the heat-shielding properties thereof are not sufficiently high and a wide variety of colors can not be given.

Referring to such a sheet as described in Japanese Patent Application Laid-open No. 2002-12679, any optional color can be given to the sheet. However, since the sheet is composed of a single layer, the types of pigments which satisfy both of required colors and heat-shielding properties have a limitation. Thus, still more expensive pigments must be employed. Generally, for formation of thermoplastic resins, the resins are rolled by means of calendaring or are formed into sheets or films by means of extrusion. However, in the case of resins containing glass beads, problems will occur in that the glass beads are broken, so that the heat-shielding effect is decreased, and moreover, the rolls or the like of extruders are damaged, and so forth. Moreover, the films or sheets formed by calendaring or extrusion are oriented in the machining direction. Thus, the sheets or films tend to be curled due to heat which is applied during their processing. Thus, it is difficult to ensure the heat-shielding effect in many cases.

Moreover, the following light-shielding sheet is known in Japanese Patent Publication No. Hei 9-241979 (U.S. Pat. No. 3091685): the sheet comprises a base-fabric, a light-shielding layer and a surface layer, in which the light-shielding layer is laminated onto the base-fabric and is formed with a high polymer composition containing aluminum power paste and a black-color type colorant, and the surface layer is laminated onto the light-shielding layer and is formed with a high polymer composition. This light-shielding sheet, even if the thickness is smaller than that of a conventional light-shielding layer, can exhibit a higher light-shielding property than the conventional light-shielding layer. Moreover, the amount of the black-color type colorant to be added can be decreased. Thus, the light-shielding layer does not become excessively black, so that influences of the light-shielding layer exerted over the color of the surface layer can be reduced. However, it is very difficult to give a variety of colors to the sheet, since a black-color type colorant is used. To give various coloring, the sheet must be further improved.

Referring to a method for applying coating materials having a heat-shielding effect, the coating materials themselves to which functions of heat-shielding and the like are given are expensive compared to generally-used coating materials. Thus, the coating materials are not preferable from the viewpoint of economy. Thus, inexpensive means is desired. Moreover, in a case of applying coating materials having a heat-shielding effect, multi-layer coating is generally repeated to attain a large thickness. Thus, such coating-work takes much time and labor.

SUMMARY OF THE INVENTION

In view of the foregoing, the present invention has been devised to solve different problems of the films having heat-shielding properties which have been proposed as described above. It is an object of the present invention to provide a heat-shielding sheet which has a superior heat shielding property and solves such defects as described above, and in particular to provide a color sheet having a light shielding effect which can be used as a film-material for a tent having a superior heat-shielding property for the purpose of decreasing the temperature rise inside tents by sun light.

Accordingly, the present invention relates to a color sheet having a light-shielding effect which contains at least a reflecting layer and a color layer in such a manner that the color layer is overcoated on the side of the color sheet where the color layer is exposed to light from the reflecting layer, the reflecting layer having a solar-radiation reflectance of 60% or more in a wavelength range of 780 nm to 1350 nm, the color layer having a light transmittance of 30% or more in a wavelength range of 780 nm to 1350 nm and a solar-radiation absorbance of 10 to 80% in a wavelength range of 380 nm to 780 nm.

Preferably, the reflecting layer is made of a polyvinyl chloride type resin compounded with at least one material selected from the group consisting of glass beads, hollow glass balloons and microcapsules, titanium oxide type white pigment and a plasticizer, and has a thickness of 0.1 to 1 mm.

Also, preferably, the color layer contains a polyvinyl chloride type resin, an acrylic type resin, or a urethane type resin and has a thickness of 0.1 to 0.5 mm and a solar-radiation absorbance of 40 to 80% in a wavelength range of 380 nm to 780 nm.

Moreover, preferably, the reflecting layer is formed in a sheet-shape by coating paste plastisol containing a polyvinyl chloride type resin as a main ingredient on a base material, followed by heating and curing.

Also, the present invention relates to a method of producing the above-described color sheet having a light-shielding effect which comprises the steps of: coating paste plastisol containing a polyvinyl chloride type resin as a main ingredient onto a base material, heating and curing the plastisol, whereby a color layer is formed; and thereafter, coating, onto the color layer, a composition containing, as a main ingredient, a polyvinyl chloride type resin compounded with a titanium oxide type white pigment and a plasticizer and with at least one material selected from the group consisting of glass beads, glass balloons and microcapsules, and heating and curing the composition, whereby a reflecting layer is formed.

According to the present invention, it can provide a color sheet having a high light-shielding effect irrespective of having a possibility that free color can be given by the structure that at least the reflecting layer and the color layer are overcoated, the reflecting layer having a solar-radiation reflectance of 60% or more in a wavelength range of 780 nm to 1350 nm, and the color layer having a light transmittance of 30% or more in a wavelength range of 780 nm to 1350 nm and a solar-radiation absorbance of 10 to 80% in a wavelength range of 380 nm to 780 nm. The color sheet can be given a desired color without particular limitations, and moreover, has a high light-shielding effect.

BRIEF DESCRIPTION OF THE DRAWINGS

Various exemplary embodiments of the invention will be described in detail with reference to the following figures, wherein.

DESCRIPTION OF THE PREFERRED EMBODIMENTS

Figure 1:
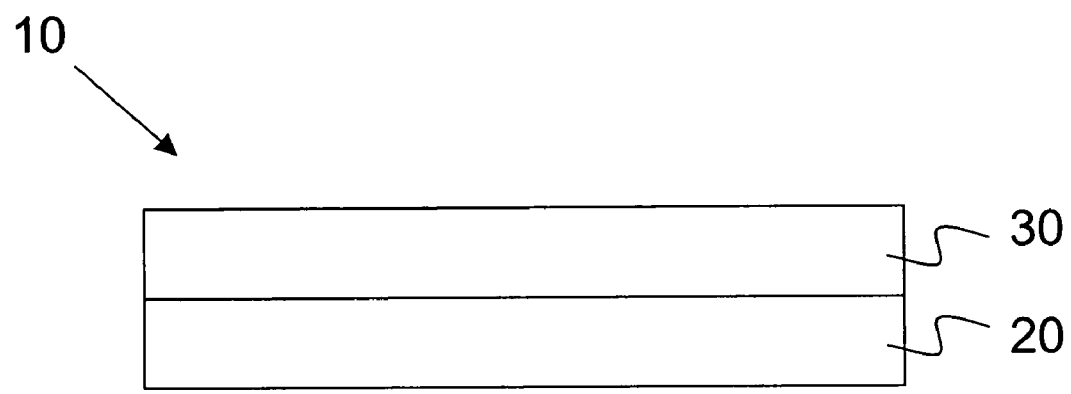
FIG. 1 is a schematic cross-sectional view of an exemplary color sheet having a light-shielding effect.

As shown, for example, in FIG 1, the present invention is characterized by a color sheet 10 which is a multi-layer structure containing a reflecting layer 20 which diffusedly reflects light-rays and a color layer 30 for which free coloring can be given, and has a heat-shielding property which is due to the light-ray shielding effect. In the color sheet 10 of the present invention, the color layer 30 is multi-coated on a side of the reflecting layer 20 where the color layer 30 is exposed to light-rays reflected from the reflecting layer 20. In other words, the color layer 30 and the reflecting layer 20 are overcoated in that order from the side of the color sheet 10 which is exposed to light-rays toward the inside of the color sheet 10.

Referring to a composition constituting the sheet of the present invention, for the reflecting layer, a polyvinyl chloride type resin, preferably, an emulsion-polymerization polyvinyl chloride type resin is used. As the polyvinyl chloride type resin, homopolymers made from vinyl chloride monomers, and copolymers made from vinyl chloride monomers and monomers copolymerizable with the vinyl chloride monomers such as vinyl acetate monomers, acrylonitrile monomers or the like can be used. Polymerization methods for the above-described polyvinyl chloride type resins have no particular limitations, but, especially, an emulsion-polymerization method is preferably used, since the polyvinyl chloride type resin produced by the emulsion-polymerization method, when a plasticizer is added, exhibits a pasty plastisol state. Moreover, micro-suspension polymerization methods, soap-free emulsion polymerization methods, suspension polymerization methods, and the like can be employed.

Preferably, in the reflecting layer containing the polyvinyl chloride type resin as a main ingredient, a filler and pigment are compounded so that the reflectivity for light-rays in the wavelength range of 780 nm to 1350 nm is 60% or more. Most preferably, in the composition, (1) at least one material selected from the group consisting of glass beads, glass balloons and microcapsules, (2) a titanium oxide type white-color pigment, and (3) a plasticizer are compounded as essential ingredients.

One material selected from glass beads, glass balloons, and microcapsules has a particle size in the range of about 1 μm to 150 μm, preferably, about 5 μm to 100 μm, more preferably, about 8 μm to 80 μm.

If the particle size exceeds 150 μm, the working-efficiency with which the composition is prepared or the composition is formed into a sheet will be deteriorated. On the other hand, if the particle size is less than 1 μm, it will be difficult to attain a desired heat-shielding effect by addition of the filler. The amount of the filler added is preferably in the range of 5 to 20 parts by weight, more preferably, 10 to 15 parts by weight, based on 100 parts by weight of the polyvinyl chloride type resin. If the amount of the filler added is less than 5 parts by weight, a satisfactory heat-shielding effect can not be attained. On the other hand, if the amount of the filler exceeds 20 parts by weight, the formation of the composition into a sheet tends to become difficult. Regarding the glass beads and the hollow glass balloons, the glass compositions, the specific gravities (void-ratio) and the like have no particular limitations. Moreover, different types of coupling treatment may be arbitrarily applied to enhance the adhesion of the glass beads or the glass balloons to the resin ingredient of the composition. In the case of the microcapsules, the shell compositions have no particular limitations. Microcapsules of heat-expandable type, microcapsules expanded in advance to be hollow and also, bead-type microcapsules may be used.

As the titanium oxide type white color pigment, rutile titanium dioxide and also anatase titanium dioxide may be used. Preferably, the rutile-type titanium dioxide is employed. The amount of the white-color pigment is preferably in the range of 3 to 30 parts by weight, more preferably, 10 to 20 parts by weight, based on 100 parts by weight of a polyvinyl chloride type resin. If the amount of the white-color pigment is less than 3 parts by weight, the heat-shielding effect will be low in some cases. On the other hand, even if the white-color pigment is added in an amount exceeding 30 parts by weight, the heat-shielding effect will not significantly be increased; rather, troubles tend to occur when the composition is formed into a sheet. Moreover, the titanium oxide type white-color pigment can be arbitrarily compounded in the form of a toner in which the pigment is dispersed in a plasticizer or the like in advance.

As the plasticizer, such compounds as are ordinarily used with polyvinylchloride type resins may be employed. Specifically, phthalate type plasticizers such as di-2-ethylhexyl phthalate (DEHP), diisononyl phthalate (DINP), diisodecyl phthalate (DIDP), dibutyl phthalate (DBP), diundecyl phthalate (DUP), butyl benzyl phthalate (BBP), and the like, trimellitate type plasticizers such as trioctyl trimellitate (TOTM) and the like, aliphatic ester type plasticizers such as dioctyl adipate (DOA), dioctyl sebacate (DOS), dioctyl azerate (DOZ), and the like, and polyester type plasticizers such as polypropyleneadipate and the like may be used.

The amounts of the plasticizers added have no particular limitations. The amount of a plasticizer is in the range of 25 to 150 parts by weight, preferably, 60 to 100 parts by weight. If the amount of the plasticizer added is too small, sol viscosity of the paste plastisol will be too high to coat and obtain uniform sheet. Thus, a sheet with good properties can not be formed. On the other hand, if the amount of the plasticizer is excessively large, the sheet will be formed so as to be too flexible. Thus, the sheet, when it is used, is softened, and the heat resistance is deteriorated in some cases.

Referring to a composition to form the reflecting layer, preferably, a stabilizer which is generally used with polyvinyl chloride is added, if necessary. Specifically, a wide variety of metal stabilizers such as those of a Ba—Zn type, a Ca—Zn type, a zinc oxide type or the like can be used. Moreover, a UV absorber and an antioxidant such as hindered amine type compounds, benzotriazole type compounds, benzothiazole type compounds and the like may be arbitrarily added. In addition, to enhance the processing-property of the composition, additives such as a viscosity-reducing agent, a thickner, and the like may be added, if necessary.

Referring to mixing of the composition to form the reflecting layer, the amounts of respective ingredients are measured, and the ingredients are homogeneously mixed by means of a mixing-agitating machine such as a dissolver mixer or the like. Moreover, the composition may be filtered so that undispersed matters are removed, if necessary. Also, the composition may be deaerated under vacuum so that air-bubbles are arbitrarily removed. Then, advantageous results can be obtained.

As the color layer, a resin layer made of any of a polyvinyl chloride type resin, an acrylic type resin or a urethane type resin may be used. In the case in which the polyvinyl chloride type resin is used, preferably, the same paste plastisol containing an emulsion-polymerization polyvinyl-chloride type resin as used in the reflecting layer is basically employed. According to the present invention, light-rays reflected from the reflecting layer are transmitted through the color layer, so that heating, which will be caused by the absorption of the light-rays, can be prevented. Moreover, the color layer has such a color as is given thereto correspondingly to the practical uses of the color sheet. To form this color sheet, various types of pigments and dyes can be added. More specifically, white lead, chrome yellow, ultramarine blue, titanium yellow, and the like can be employed, for example.

In the case of the acrylic type resin to be used in the color layer, solution-type polymers and emulsion-type polymers made from acrylates or methacrylates can be preferably used. A desired colorant may be added to a composition containing the acrylic type resin. Thus, the color resin layer is formed.

Similarly, a colorant may be added to a solution-type polymer or emulsion-type polymer of a urethane type resin. Thus, the color resin layer is formed.

To form the reflecting layer and the color layer, various kinds of methods can be applied. For example, first, the reflecting layer may be formed in a sheet shape, and the color layer is overcoated onto one side of the reflecting layer. On the contrary, first, the color layer may be formed, and the reflecting layer is arbitrarily overcoated onto one side of the color layer. Especially, in the case in which polyvinyl chloride type resin paste plastisol is used for both of the color layer (or the reflecting layer) and the reflecting layer (or the color layer), a sheet may be formed by coating a composition for the color layer (or the reflecting layer) to a predetermined thickness on paper or a film having a releasing-property by an appropriate technique, heating and curing the coated composition, then, coating a composition for the reflecting layer (or the color layer) thereon to a predetermined thickness by an appropriate technique, heating and curing the coated composition, and releasing the overcoated compositions from the paper or film.

This method is especially advantageous, since the glass balloons, microcapsules and the like are prevented from being broken while the compositions are formed into sheets.

In the case of the acrylic type resin or the urethane type resin for use in the color layer, only the composition for the reflecting layer may be coated on paper or a film having a release-property, heated and cured, and then released from the paper or film. Thus, the reflecting layer sheet is formed. Thereafter, in a process separate from the above-described process for formation of the reflecting layer, a composition for the color layer is overcoated on the reflecting layer thereon by means of a gravure coater or the like.

Referring to the sheets each having a structure in which the color layer and the reflecting layer are overcoated on each other, the sheet is given a heat-shielding property and an aesthetic color. For this purpose, the reflecting layer is required to have a high solar-radiation reflectance in a wavelength range which contributes heat generation among wavelengths constituting sunlight. The color layer is required to have a high solar-radiation transmittance in a wavelength range which constitutes heat generation among wavelengths constituting sunlight. Moreover, the color layer is required to have an appropriate solar-radiation absorbance in a wavelength which contributes coloring among wavelengths constituting sunlight. In other words, according to the sheet formed so as to satisfy the above-described requirements, the heat-shielding property thereof hardly depends on selected color of the color layer. The solar-radiation reflectance can be controlled by the reflecting layer, and thereby, the heat-shielding property is ensured. Moreover, a desired color can be exhibited due to the color layer. According to the present invention, the solar-radiation reflectance of the reflecting layer is 60% or more, preferably, 70% or more, most preferably, 80% or more in the wavelength range of 780 nm to 1350 nm. Of the wavelength range contained in sunlight, wavelength range which constitutes heating is in the range of at 780 nm or more. Referring to the ratios in wavelength of the waves constituting sunlight, the ratio of the waves in the wavelength range of 1350 nm or more is very small. Accordingly, to prevent, by reflection, not by light-absorbance, the reflecting layer of the sheet from storing heat, the reflectivity of the reflecting layer in the wavelength range of 780 to 1350 nm is a very important factor. When the reflectivity is less than 60%, the heat-shielding effect is considerably reduced.

The color layer of the sheet according to the present invention has a solar-radiation transmittance of 30% or more, preferably, 40% or more, more preferably, 50% or more in the wavelength range of 780 to 1350 nm. If the solar-radiation reflectance of the color layer is less than 30%, the color layer will absorb incident light-rays before the incident light-rays reach the reflecting layer, and moreover, the color layer will absorb light-rays reflected from the reflecting layer before the reflected light-rays reach the outside of the color layer. Thus, the sheet of the present invention stores heat.

The color layer has a solar-radiation reflectance of 10 to 80% in the wavelength range of 380 nm to 780 nm. The wavelength range of 380 to 780 nm corresponds to that of the visible light. The sheet according to the present invention has a predetermined solar-radiation absorbance in the above-described wavelength range, so that a variety of colors can be given to the sheet according to the present invention. Thus, the color can be desirably exhibited. When the sheet is colored white, the solar-radiation absorbance is 10%. For the sheets given colors excluding white, the solar-radiation absorbance of the sheets has a lower limit of about 40%. The sunlight in the wavelength range of 380 to 780 nm makes a small contribution to heating. Thus, even if the sunlight in this wavelength range is absorbed, the sheet is suppressed from significantly storing heat.

Thus, the colors and thicknesses (thickness and thickness-ratio of layers) of the color layer and the reflecting layer must be determined in such a manner that the above-described ranges can be satisfied.

Referring to the reflecting layer, the thickness is preferably in the range of 0.1 mm to 1 mm, more preferably, 0.4 to 1 mm. If the thickness of the reflecting layer is less than 0.1 mm, it will be difficult to ensure a satisfactory solar-radiation reflectance.

For the color layer, the thickness is preferably in the range of 0.1 mm to 0.5 mm. If the thickness exceeds 0.5 mm, it will be difficult to ensure a solar-radiation transmittance of 30% or more. Thus, heat is stored in the color layer, so that the heat-reflecting performance is damaged. Thus, the thickness exceeding 0.5 mm is unfavorable.

Figure 2:
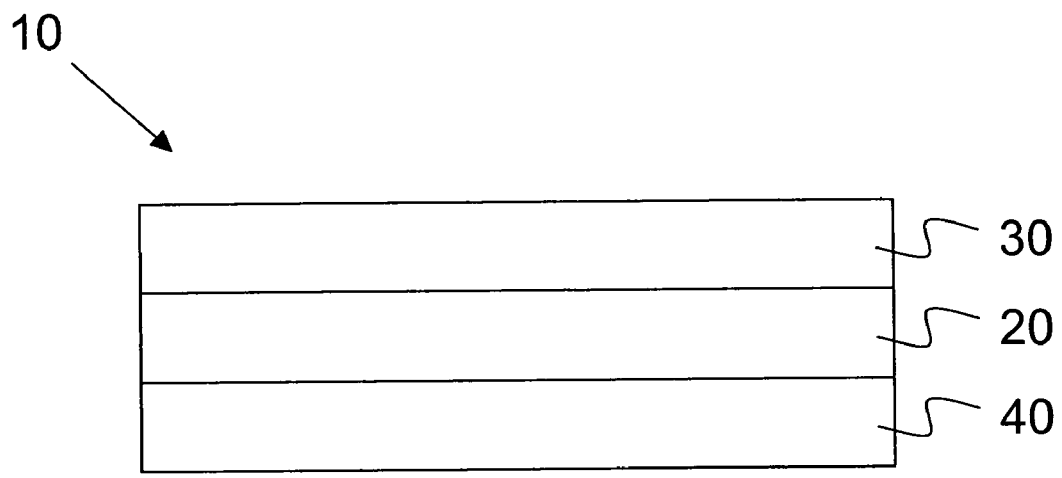
FIG. 2 is a schematic cross-sectional view of an exemplary color sheet having a light-shielding effect.

As shown, for example, in FIG 2, to bond the sheet 10 of the present invention to the surface of an object, a pressure sensitive adhesion (PSA) layer 40 may be formed on the back surface of the reflecting layer 20 in advance. To form the PSA layer 40, methods which are generally used can be applied. Moreover, the sheet 10 may be bonded to an object by use of various kinds of adhesives during execution using the sheet 10. Moreover, an appropriate tacky-property may be given, that is, a self-tacky-adhesion ability is given to a layer which comes into contact with the object. In this case, a small amount of a tackifier (agent for rendering a tacky-adhesive property) such as rosin esters or the like may be added to the composition, so that the sheet 10 has a high adhesive property.

Figure 3:
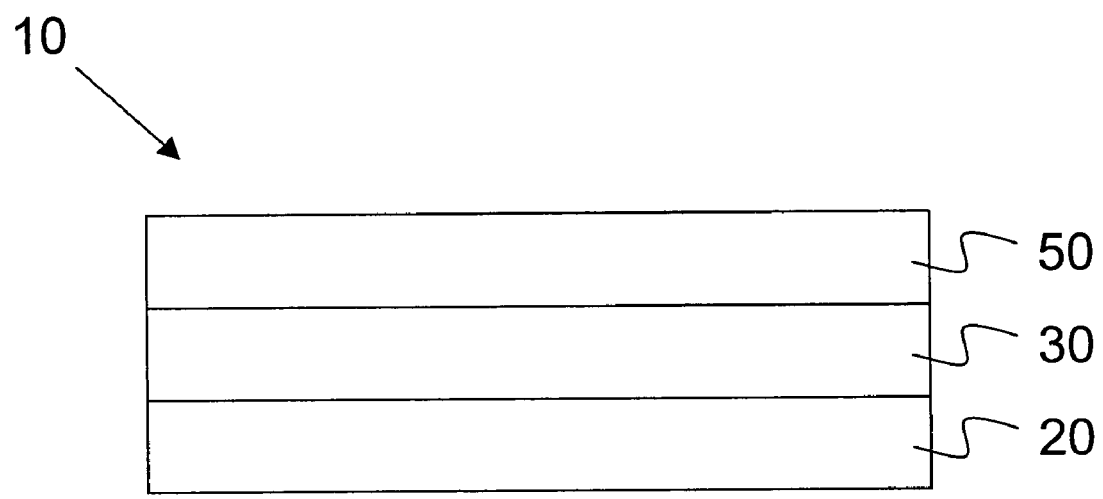
FIG. 3 is a schematic cross-sectional view of an exemplary color sheet having a light-shielding effect.

As shown, for example, in FIG 3, in the color sheet 10 of the present invention, an anti-soiling layer 50 may be formed on the surface of the color layer 30. The anti-soiling layer 50 can be formed by application of an anti-soiling coating material of a solvent-type, an aqueous type and a UV-curable type.

As the solvent type coating material, coating materials of an acrylic resin type, a vinyl chloride resin type, a cellulose resin type, a fluororesin type, a polyamide resin type, a urethane resin type, an epoxy resin type, a silicone resin type and the like can be used.

As the aqueous coating material, for example, coating materials of an acrylic resin type, a polyester resin type, a urethane resin type, an epoxy resin type and the like can be used.

As the UV-curable type coating materials, for example, coating materials of an acrylic resin type, an acryl-modified urethane resin type, an acryl-modified epoxy resin type, a mercapto-derivative type, an epoxy resin type and the like can be used.

Figure 4:
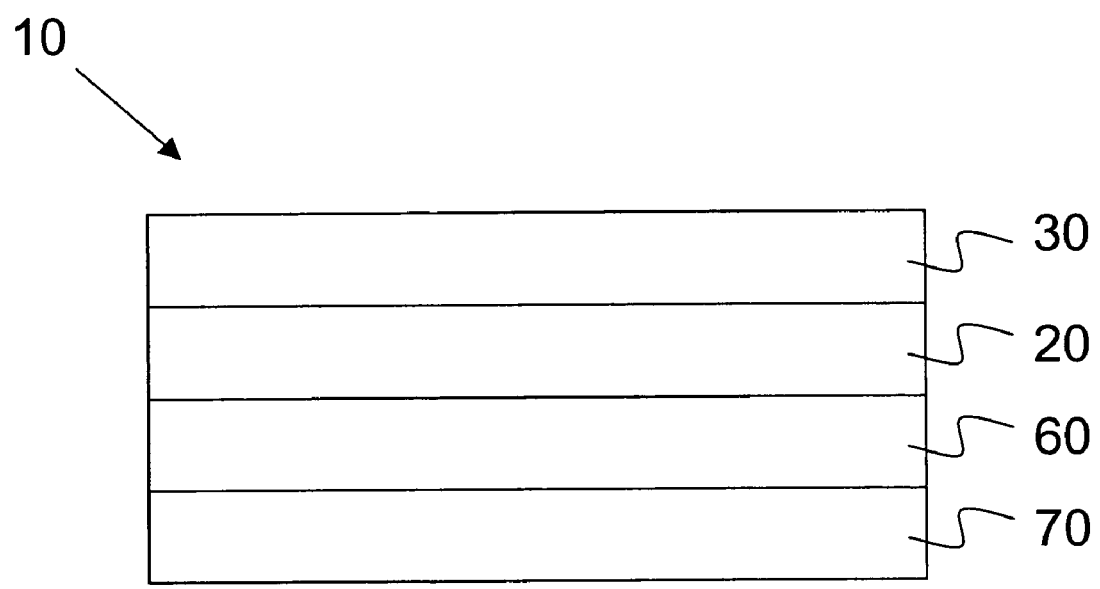
FIG. 4 is a schematic cross-sectional view of an exemplary color sheet having a light-shielding effect.

As shown, for example, in FIG 4, fibrous base-pieces 60 such as woven fabrics, non-woven fabrics or the like may be provided on the reflecting layer 20. The fibrous base-piece 60 may be laminated, by use of an adhesive, to the reflecting layer 20 side and the color layer 30 formed on the reflecting layer 20 is also preferably curried out by the lamination of the fibrous base-piece 60. Moreover, the reflecting layer 20 may be formed on a fibrous base-piece 60 in such a manner that the resin of the composition to form the reflecting layer 20 is impregnated into the fibrous base-piece 60. Moreover, a resin layer 70 may be formed on the fibrous base-piece 60 side of the laminate composed of the color layer 30, the reflecting layer 20 and the fibrous base-piece 60. Thus, the sheet 10 has a multi-layer structure.

By providing the fibrous base-piece, tear strength and tensile strength of the sheet are enhanced, and moreover, the durability of the sheet which is exhibited during its use, and the dimensional stability which is exhibited during its construction are enhanced.

Especially, the sheet of the present invention is suitable for use as a sheet material such as a tarpaulin for tents, especially for outdoor use. Thus, problems will occur on sunny days in that the temperature inside the tents is increased, which is a hindrance to working or the like inside the tents. As countermeasures to solve the problems, air conditioners are installed, for example. However, it is difficult to decrease the temperature inside the tents, especially inside of large-sized tents. Thus, adjustment of the temperature inside the tents is troublesome. The sheet of the present invention has a high solar-radiation reflectance in the wavelength range in which the sunlight contributes to heating, so that the sheet can suppress the temperature inside the tents from rising which is caused by solar-radiation radiation. Moreover, the sheet has a predetermined solar-radiation absorbance in the wavelength range of sunlight where the sunlight contributes to coloring. Thus, the color layer can satisfactorily exhibit its color. Thus, tents with a variety of colors can be provided. Moreover, the sheet of the present invention is useful as a sheet material for tents having a high strength, when the sheet is processed so as to have a multi-layer structure containing the fibrous base-piece layer as described above.

A tarpaulin is suitable for the tent materials. To obtain the tarpaulin, two polyvinyl chloride based sheets are heat-laminated simultaneously with a woven fabric in the middle. Alternatively, the two sheets are laminated by using chemical adhesives. At least one side of thus obtained tarpaulin, which is exposed to the sun light, is made by the color sheet having a light-shielding effect of the present invention.

Hereinafter, the present invention will be described with reference to Examples in detail. However, the present invention is not limited to the Examples.

EXAMPLES 1 to 9 AND COMPARATIVE EXAMPLES 1 to 3

Preparation of Past Plastisol for Formation of Reflecting Layer and Color Layer:

To form the reflecting layer, various kinds of fillers, white pigment, a plasticizer (diisononyl phthalate) and a heat stabilizer were homogeneously mixed with an emulsion-polymerization polyvinylchloride (PX-QHPN, manufactured by SHIN DAIICHI VINTL CORPORATION) by means of a dissolver mixer. Thus, past plastisol to form the reflecting layer was prepared.

To form the color layer, a plasticizer (diisononyl phthalate), a heat stabilizer, and pigment were homogeneously mixed with an emulsion polymerization polyvinylchloride (PHS-23, manufactured by KANEKA CORPORATION) by means of a dissolver-type mixer. Thus, past plastisol to form the color layer was prepared. Table 1 shows the recipes of the past plastisol for the color layer. Tables 2 and 3 show the recipes of the past plastisol for the reflecting layer.

TABLE 1

| Reflecting layer (plastisol) | A1 | A2 | A3 | A4 | A5 |
|---|---|---|---|---|---|
| <Recipe (parts by weight)> | | | | | |
| Polyvinylchloride type resin 1 | 100 | 100 | 100 | 100 | 100 |
| Plasticizer | 70 | 70 | 70 | 70 | 70 |
| Stabilizer 1 | 3 | 3 | 3 | 3 | 3 |
| Filler 1 | 15 | 15 | | | |
| Filler 2 | | | 15 | 15 | |
| Pigment 1 | 15 | 15 | 15 | 15 | |
| Pigment 2 | | | | | 1 |
| Hue | white | white | ivory | ivory | green |
| Thickness (mm) | 0.4 | 0.3 | 0.4 | 0.05 | 0.5 |
| Solar-radiation reflectance (%) in wavelength range of 780 nm to 1350 nm | 83 | 76 | 63 | 54 | 42 |

TABLE 2

| Color layer (plastisol) | B1 | B2 | B3 | B4 | B5 | B6 |
|---|---|---|---|---|---|---|
| <Recipe (parts by weight)> | | | | | | |
| Polyvinylchloride type resin 2 | 100 | 100 | 100 | 100 | 100 | 100 |
| Plasticizer | 70 | 70 | 70 | 70 | 70 | 70 |
| Stabilizer 1 | 3 | 3 | 3 | 3 | 3 | 3 |
| Pigment 2 | 1 | | | | | |
| Pigment 3 | | 1 | | 1 | 1 | 1 |
| Pigment 4 | | | 1 | | | |
| Pigment 5 | | | 0.1 | | | |
| Hue | green | yellow | brown | yellow | yellow | yellow |
| Thickness (mm) | 0.1 | 0.1 | 0.1 | 0.2 | 0.4 | 0.6 |
| Solar-radiation reflectance (%) in wavelength range of 780 nm to 1350 nm | 46 | 47 | 49 | 42 | 35 | 28 |
| Solar-radiation absorbance (%) in wavelength range of 380 nm to 780 nm | 56 | 45 | 60 | 49 | 54 | 58 |

TABLE 3

| Color layer (plastisol) | B7 | B8 |
|---|---|---|
| <Recipe (parts by weight)> | | |
| Acrylic type resin | 100 | |
| Polyurethane type resin | | 100 |
| Plasticizer | | |
| Stabilizer 2 | 1 | 1 |
| Pigment 2 | 1 | |
| Pigment 3 | | 1 |
| Pigment 4 | | |
| Pigment 5 | | |
| Hue | green | yellow |
| Thickness (mm) | 0.1 | 0.1 |
| Solar-radiation reflectance(%) in wavelength range of 780 nm to 1350 nm | 45 | 47 |
| Solar-radiation absorbance(%) in wavelength range of 380 nm to 780 nm | 56 | 45 | polyvinylchloride type resin 1:
PX-QHPN, manufactured by SHIN DAIICHI VINYL CORPORATION
polyvinylchloride type resin 2:
PSH-23, manufactured by KANEKA CORPORATION
acrylic type resin:
TEISAN RESIN WS-023B, manufactured by Teikoku Sangyo Industries Co., Ltd.
polyurethane type resin:
aqueous type urethane resin, ADEKA BONTIGHTER HUX-290H, manufactured by ASAHI DENKA CO., LTD.
plasticizer 1:
isononyl phthalate, manufactured by SEKISUI CHEMICALS CO., LTD.
stabilizer 1:
AC183, manufactured by ASAHI DENKA CO., LTD.
stabilizer 2:
Chimassorp 944LD, Chiba Specialty Chemicals K.K.
filler 1:
glass balloon, CELSTAR Z27, manufactured by Asahi Glass Co., Ltd.

filler 2:
ceramic balloon, E-SPHERES, manufactured by TAIHEIYO CEMENT CORPORATION
pigment 1:
titanium oxide type white pigment, JR600A, manufactured by Tayca Corporation
pigment 2:
green pigment, KT-1800, manufactured by Tokushu Shikiryo Color & Chemicals Inc.
pigment 3:
yellow pigment, FT-3001, manufactured by Fuji Pigment Co., Ltd.
pigment 4:
brown pigment, KT-3974, manufactured by Tokushu Shikiryo Color & Chemicals Inc.
pigment 5:
green pigment, K-213, manufactured by DAINIPPON INK AND CHEMICALS, INCORPORATED Formation of Sheet First, to evaluate the performance of each of the reflecting layer and the color layer, the past plastisol prepared as described above was coated onto release paper to a predetermined thickness by a blade knife coating method, heated at 140° C. for 2 minutes, and then heated at 195° C. for 3 minutes. Thereafter, the plastisol coated on the release paper was cooled and released from the release paper to produce a sheet. In the case in which the polyvinylchloride resin is used to form not only the reflecting layer but also the color layer, first, paste plastisol for the reflecting layer was coated onto release paper to a predetermined thickness, heated at 140° C. for 2 minutes. Then, plastisol for the color layer was coated thereon, and heated at 195° C. for 3 minutes. The coated plastisol was cooled and released from the release paper. Thus, a composite sheet was formed. Table 1 shows the thicknesses of the sheets for the reflecting layers. Tables 2 and 3 show the thicknesses of the sheets for the color layer. Moreover, Table 1 shows the solar-radiation reflectances of the sheets. Tables 2 and 3 show the solar-radiation transmittances and solar-radiation absorbances of the respective sheets.

Solar-radiation Transmittance:

The solar-radiation transmittance was measured as follows: for the measurement, a self-registering spectrophotometer U-4000 (manufactured by Hitachi, Ltd.); the measurement value obtained when no sample was placed was taken as a transmittance of 100%; the spectral transmittances of the samples of Examples and Comparative Examples were measured in a predetermined wavelength range; and the spectral transmittances were derived using Attached Table 3 of JIS (Japan Industrial Standard) A5759. Specifically, the solar-radiation transmittance was calculated according to the following calculation formula:

solar-radiation transmittance (T$\lambda$) measured at wavelength $\lambda$=weight-factor ($\alpha$)×spectral transmittance (t$\lambda$) measured at wavelength $\lambda$ solar-radiation transmittance (T)=T350 +T400+. . . +T2100

Solar-radiation Absorbance:

Solar-radiation absorbance was determined based on the solar-radiation transmittance and the solar-radiation reflectance, using the equation, absorbance+reflectance+transmittance=100.

Solar-radiation Reflectance (Spectral Solar-radiation Reflectance Testing Method):

A self-registered spectrophotometer U-4000 (manufactured by Hitachi, Ltd.) was used; the reflectance of an alumina white plate was taken as 100%; the spectral solar-radiation reflectances of the samples of Examples and Comparative Examples were measured; the sum of the spectral reflectance values at the respective wavelengths multiplied by weighting factors was calculated, using Attached Table 3 of JIS A5759, and thus, the solar-radiation reflectance was derived.

Heat-Shielding Performance Test

The heat-shielding performance test was carried out as follows: a box with a size of 150 mm in height, 220 mm in width, and 310 mm in length, of which the side walls were made of a foamed polystyrene board having a thickness of 30 mm and the upper face of the box was opened; the reflecting layer side of each of the heat-shielding sheets formed according Examples and Comparative Examples was bonded to a steel sheet of 220 mm in width, 310 mm in length, and 0.3 mm in thickness, the steel sheet was disposed so as to cover the upper face of the box in such a manner that the uncovered steel sheet side came to inside of the box; each sample (heat-shielding sheet) was irradiated for 40 minutes by means of an incandescent lamp with a power of 200W positioned 300 mm above the sample, and then, the temperatures of the back surface of the sample and the inside of the box were measured.

Table 4 shows the constitutions of the sheets of Examples and Comparative Examples, and the measured temperatures of the back surfaces of the samples and the insides of the boxes obtained according to the hest-shielding performance test method.

The sheets of Examples 1 to 9 are color sheets having a heat-shielding effect according to the present invention. The sheets are composite sheets of which the reflecting layers and the color layers have the compositions and the thicknesses shown in Tables 1 to 3 and which are formed according to the above-described methods for forming sheets. The sheets of Comparative Examples 1 to 3 are composite sheets having the compositions and the thicknesses shown in Tables 1 and 2, and the reflectances and the transmittances depart from the scope of the present invention. The sheet of Comparative Example 3 has the composition represented by A1 and has a thickness of 0.5 mm. These results have revealed that the sheets within the scope of the present invention have superior heat-shielding performance.

TABLE 4

|  | Constitution | Color | Thickness (mm) | Ratio of reflecting layer (%) | Back-surface temperature (° C.) | Box-inside temperature (° C.) |
| --- | --- | --- | --- | --- | --- | --- |
| Example 1 | A1 × B1 | green | 0.5 | 80 | 43 | 31 |
| Example 2 | A2 × B1 | green | 0.4 | 75 | 46 | 34 |
| Example 3 | A3 × B1 | green | 0.5 | 80 | 48 | 37 |

TABLE 4-continued

|  | Constitution | Color | Thickness (mm) | Ratio of reflecting layer (%) | Back-surface temperature (° C.) | Box-inside temperature (° C.) |
|---|---|---|---|---|---|---|
| Example 4 | A1 × B2 | yellow | 0.5 | 80 | 45 | 32 |
| Example 5 | A1 × B3 | brown | 0.5 | 80 | 48 | 36 |
| Example 6 | A1 × B4 | yellow | 0.6 | 67 | 47 | 35 |
| Example 7 | A1 × B5 | yellow | 0.8 | 50 | 49 | 38 |
| Example 8 | A1 × B7 | green | 0.5 | 80 | 43 | 31 |
| Example 9 | A1 × B8 | yellow | 0.4 | 75 | 46 | 34 |
| Comparative Example 1 | A4 × B1 | green | 0.2 | 50 | 61 | 45 |
| Comparative Example 2 | A1 × B6 | yellow | 1.0 | 40 | 60 | 45 |
| Comparative Example 3 (generally used sheet) | A5 (Recipe) | green | 0.5 | — | 68 | 49 |

What is claimed is:

1. A color sheet having a light-shielding effect, comprising at least a reflecting layer and a color layer such that the color layer is exposed to light from the reflecting layer, wherein:
the reflecting layer has a solar-radiation reflectance of 60% or more in a wavelength range of 780 nm to 1350 nm;
the color layer has a light transmittance of 30% or more in a wavelength range of 780 nm to 1350 nm and a solar-radiation absorbance of 10 to 80% in a wavelength range of 380 nm to 780 nm;
the reflecting layer is made of a polyvinyl chloride type resin compounded with a titanium oxide type white pigment, a plasticizer and at least one material selected from the group consisting of glass beads, hollow glass balloons, and microcapsules; and
a hue of the reflecting layer is white or ivory.

2. A color sheet having a light-shielding effect according to claim 1, wherein the reflecting layer has a thickness of 0.1 to 1 mm.

3. A color sheet having a light-shielding effect according to claim 2, wherein the color layer contains at least one material selected from a polyvinyl chloride type resin, an acrylic type resin or a urethane type resin, and has a thickness of 0.1 to 0.5 mm and a solar-radiation absorbance of 40 to 80% in a wavelength range of 380 nm to 780 nm.

4. A color sheet having a light-shielding effect according to claim 3, wherein the reflecting layer is formed in a sheet-shape by coating paste plastisol containing a polyvinyl chloride type resin as a main ingredient onto a base material, and heating and curing the plastisol.

5. A color sheet having a light-shielding effect according to claim 2, wherein the reflecting layer is formed in a sheet-shape by coating paste plastisol containing a polyvinyl chloride type resin as a main ingredient onto a base material, and heating and curing the plastisol.

6. A tarpaulin at least one side of which is made from the color sheet having a light-shielding effect according to claim 2.

7. A tent made from a material using the color sheet having a light-shielding effect according to claim 2.

8. A color sheet having a light-shielding effect according to claim 1, wherein the color layer contains at least one material selected from a polyvinyl chloride type resin, an acrylic type resin or a urethane type resin, and has a thickness of 0.1 to 0.5 mm and a solar-radiation absorbance of 40 to 80% in a wavelength range of 380 nm to 780 nm.

9. A color sheet having a light-shielding effect according to claim 8, wherein the reflecting layer is formed in a sheet-shape by coating paste plastisol containing a polyvinyl chloride type resin as a main ingredient onto a base material, and heating and curing the plastisol.

10. A color sheet having a light-shielding effect according to claim 1, wherein the reflecting layer is formed in a sheet-shape by coating paste plastisol containing a polyvinyl chloride type resin as a main ingredient onto a base material, and heating and curing the plastisol.

11. A method of producing a color sheet having a light-shielding effect defined in claim 1, comprising the steps of:
coating paste plastisol containing a polyvinyl chloride type resin as a main ingredient onto a base material, heating and curing the plastisol, whereby a color layer is formed; and thereafter,
coating, onto the color layer, a composition containing, as a main ingredient, a polyvinyl chloride type resin compounded with a titanium oxide type white pigment and a plasticizer and with at least one material selected from the group consisting of
glass beads, hollow glass balloons, and microcapsules, and heating and curing the composition, whereby a reflecting layer is formed.

12. A tarpaulin at least one side of which is made from the color sheet having a light-shielding effect according to claim 1.

13. A tent made from a material using the color sheet having a light-shielding effect according to claim 1.

* * * * *